(12) United States Patent
Veach et al.

(10) Patent No.: US 7,844,493 B1
(45) Date of Patent: Nov. 30, 2010

(54) AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION

(75) Inventors: Eric Veach, Mountain View, CA (US); Salar Arta Kamangar, Palo Alto, CA (US)

(73) Assignee: Google, Inc., Mountainview, CA (US)

( * ) Notice: Subject to any disclaimer, the term of this patent is extended or adjusted under 35 U.S.C. 154(b) by 1828 days.

(21) Appl. No.: 10/340,542

(22) Filed: Jan. 10, 2003

Related U.S. Application Data

(60) Provisional application No. 60/424,792, filed on Nov. 8, 2002.

(51) Int. Cl.
*G06Q 30/00* (2006.01)
(52) U.S. Cl. .............. 705/14.46; 705/14.55; 705/14.71
(58) Field of Classification Search .............. 707/3; 705/14, 27, 14.46, 14.55, 14.71
See application file for complete search history.

(56) References Cited

U.S. PATENT DOCUMENTS

| | | | |
|---|---|---|---|
| 5,752,238 A | 5/1998 | Dedrick | |
| 5,794,210 A | 8/1998 | Goldhaber et al. | |
| 5,835,896 A | 11/1998 | Fisher et al. | |
| 5,848,396 A | 12/1998 | Gerace | |
| 5,855,008 A | 12/1998 | Goldhaber et al. | |
| 5,905,975 A | 5/1999 | Ausubel | |
| 5,933,811 A | 8/1999 | Angles et al. | |
| 5,948,061 A | 9/1999 | Merriman et al. | |
| 5,974,398 A | 10/1999 | Hanson et al. | |
| 5,991,735 A | 11/1999 | Gerace | |
| 6,078,866 A | 6/2000 | Buck et al. | |
| 6,216,112 B1 | 4/2001 | Fuller et al. | |
| 6,243,375 B1 | 6/2001 | Speicher | |
| 6,253,189 B1 | 6/2001 | Feezell et al. | |
| 6,269,361 B1 | 7/2001 | Davis et al. | |
| 6,279,036 B1 | 8/2001 | Himmel et al. | |
| 6,285,987 B1 | 9/2001 | Roth et al. | |

(Continued)

FOREIGN PATENT DOCUMENTS

| | | |
|---|---|---|
| WO | WO 97/17774 | 5/1997 |

(Continued)

OTHER PUBLICATIONS

Define: Ad preference value—Google Definitions, downloaded Dec. 31, 2009.*

(Continued)

*Primary Examiner*—Donald L Champagne
(74) *Attorney, Agent, or Firm*—Straub & Pokotylo; John C. Pokotylo

(57) ABSTRACT

A cost maintenance scheme useful with an advertising system which orders ads in a manner that maximizes both their relevance and their economic value, and which provides a fair bidding process in which a winning bidder is assured of not having paid too much. Ordering may be done based on accepted maximum ad bid information and/or ad performance information. For example, this information may be used to determine a position value. Cost may be determined based on accepted maximum ad bid information and/or performance information. Billing the determined cost may be subject to a condition precedent.

32 Claims, 10 Drawing Sheets

| AD | MAX COST PER RESULT (e.g., MAX BID PER CLICK) | PERFORMANCE PARAMETER (e.g., CLICK-THROUGH RATE) | PLACEMENT VALUE | PLACEMENT ORDER | ACTUAL COST PER RESULT (e.g., COST BILLED PER CLICK-THROUGH) |
|---|---|---|---|---|---|
| A | $5.00 | 0.01 | 0.050 | 2nd | $4.00 |
| B | $1.50 | 0.04 | 0.060 | 1st | $1.25 |
| C | $1.00 | 0.04 | 0.040 | 3rd | $0.75 |
| D | $0.90 | 0.03 | 0.027 | 5th | — |
| E | $0.25 | 0.12 | 0.030 | 4th | $0.225 |

U.S. PATENT DOCUMENTS

| | | | |
|---|---|---|---|
| 6,324,519 | B1 | 11/2001 | Eldering |
| 6,334,109 | B1 | 12/2001 | Kanevsky et al. |
| 6,338,066 | B1 | 1/2002 | Martin et al. |
| 6,343,274 | B1 | 1/2002 | McCollom et al. |
| 6,385,592 | B1 | 5/2002 | Angles et al. |
| 6,401,075 | B1 | 6/2002 | Mason et al. |
| 6,487,538 | B1 | 11/2002 | Gupta et al. |
| 6,519,571 | B1 | 2/2003 | Guheen et al. |
| 6,907,566 | B1 | 6/2005 | McElfresh et al. |
| 7,177,832 | B1 | 2/2007 | Semret et al. |
| 7,225,151 | B1 | 5/2007 | Konia |
| 7,231,358 | B2 * | 6/2007 | Singh et al. ............ 705/14.46 |
| 2002/0169760 | A1 * | 11/2002 | Cheung et al. ............ 707/3 |
| 2003/0014331 | A1 * | 1/2003 | Simons ............ 705/27 |
| 2003/0055729 | A1 * | 3/2003 | Bezos et al. ............ 705/14 |

FOREIGN PATENT DOCUMENTS

| | | |
|---|---|---|
| WO | WO 97/26729 | 7/1997 |
| WO | WO 00/57333 | 9/2000 |
| WO | WO 01/01217 | 1/2001 |

OTHER PUBLICATIONS

Ad preference value—Google Search, downloaded Dec. 31, 2009.*

Thomson, Dean B. et al., "Reverse Auction Bidding", Sep. 1, 2002, downloaded Jul. 18, 2010 from http://www.fwhtlaw.com/articles/reverse_auction_bidding.cfm.*

"Overture Reports Strong Second Quarter 2002 Results: Company Announces Fourth Consecutive Quarter of Profitability" (Jul. 25, 2002).

D. Lucking-Reiley, "Vickrey Auctions in Practice: From Nineteenth-Century Philately to Twenty-First-Century E-Commerce", *Journal of Economic Perspectives*, vol. 14, No. 3, pp. 183-192 (Summer 2000).

K. Reynolds, "Auctions—The Vickrey Auction" (1996), downloaded from www.Agorics.com/Library/Auctions/auction5.html.

H. B. Leonard, "Elicitation of Honest Preferences for the Assignment of Individuals to Positions", *Journal of Political Economy*, vol. 91, No. 3, pp. 461-479 (Jun. 1983).

F. T. Lui, "An Equilibrium Queuing Model or Bribery", *Journal of Political Economy*, vol. 93, No. 4, pp. 760-781 (Aug. 1985).

"New Service Puts Ad Auction, Search Engine Under one Roof," Electronic Advertising & Marketplace Report, vol. 12, No. 8 (Simba Information Inc. Apr. 28, 1998).

T. Riordan, "Aiming Web Ads More Effectively", *New York Times*, Technology Section (Dec. 7, 1998).

S. Eads, "One Biz Owner.Auctions Prime Web Ad Space to Other Owners", Business Week (Nov. 18, 1998).

K. Gallagher, J. Parsons, "A Framework for Targeting Banner Advertising on the Internet", *Proceedings of the 30th International Conference on System Sciences*, vol. 4, pp. 265-274 (Wailea, Hawaii, Jan. 7-10, 1997).

M. McCandless, "Web Advertising", *IEEE Intelligent Systems*, vol. 13, pp. 8-9, (May-Jun. 1999).

V. Ng, Mok Kwan-Ho, "An Intelligent Agent for Web Adertisements", *Proceedings of the Third International Symposium on Cooperative Database Systems for Advanced Applications*, pp. 102-109, (Beijing, China, Apr. 23-24, 2001).

D. Siew, X. Yi, "Agent-Mediated Internet Advertising", *Second International Workshop on Advanced Issues of E-Commerce and Web-Based Information Systems, 2000*, pp. 102-108, (Milpitas, California, Jun. 8-9, 2000).

R. R. Yager, "Targeted E-commerce marketing Using Fuzzy Intelligent Agents", *IEEE Intelligent Systems*, vol. 15, pp. 42-45, (New Rochelle, New York, Nov.-Dec. 2000).

Alvin E. Roth and Axel Ockenfels, "Last-Minute Bidding and the Rules for Ending Second-Price Auctions: Evidence from eBay and Amazon Auctions on the Internet," *American Economic Review*, vol. 92, No. 4, Sep. 2002, 1093-1103.

Eric Veach, et al., U.S. Appl. No. 10/340,543, entitled, "Automated Price Maintenance for Use With a System in Which Advertisements Are Rendered With Relative Preferences", filed Jan. 10, 2003.

* cited by examiner

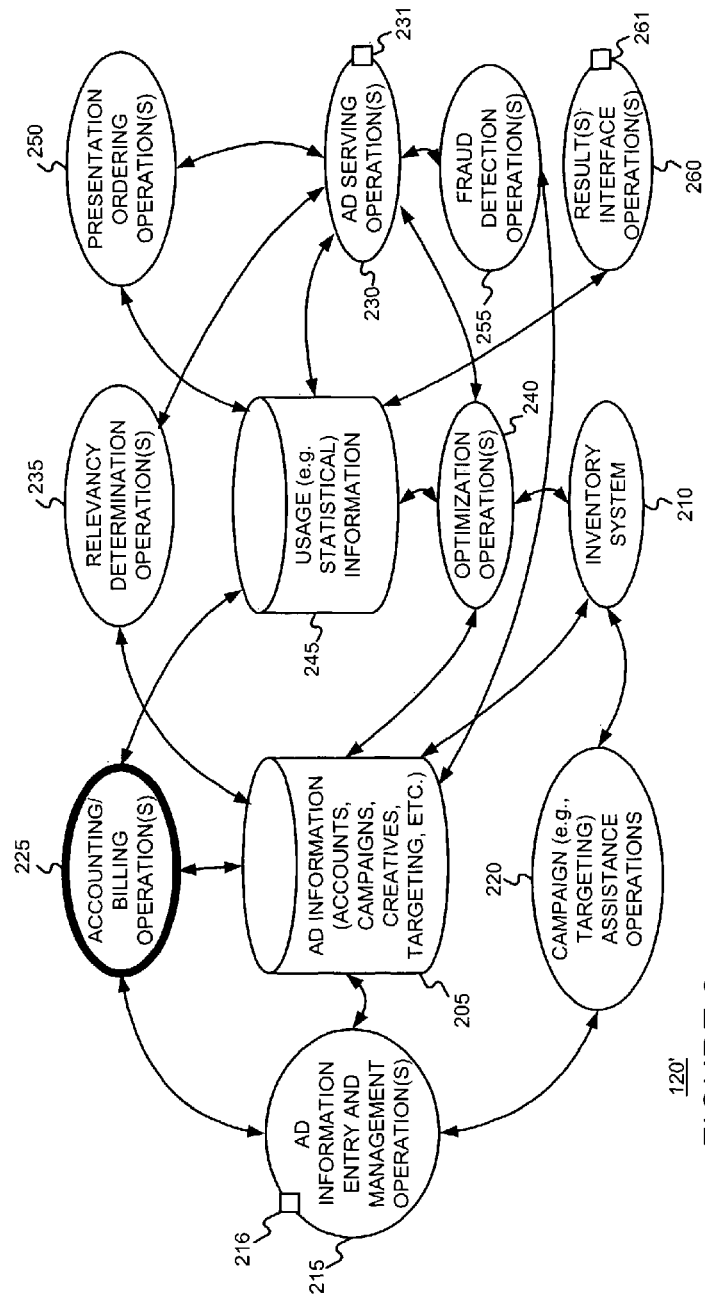

| AD | MAX COST PER RESULT (e.g., MAX BID PER CLICK) | PERFORMANCE PARAMETER (e.g., CLICK-THROUGH RATE) | PLACEMENT VALUE | PLACEMENT ORDER | ACTUAL COST PER RESULT (e.g., COST BILLED PER CLICK-THROUGH) |
|---|---|---|---|---|---|
| A | $5.00 | 0.01 | 0.050 | 2nd | $4.00 |
| B | $1.50 | 0.04 | 0.060 | 1st | $1.25 |
| C | $1.00 | 0.04 | 0.040 | 3rd | $0.75 |
| D | $0.90 | 0.03 | 0.027 | 5th | — |
| E | $0.25 | 0.12 | 0.030 | 4th | $0.225 |

FIGURE 6

AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION

§0. RELATED APPLICATION

Benefit is claimed, under 35 U.S.C. §119(e)(1), to the filing date of provisional patent application Ser. No. 60/424,792, entitled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION", filed on Nov. 8, 2002 and listing Eric Veach as the inventor, for any inventions disclosed in the manner provided by 35 U.S.C. §112, ¶ 1. That provisional application is expressly incorporated herein by reference.

§1. BACKGROUND OF THE INVENTION

§1.1 Field of the Invention

The present invention concerns advertising. In particular, the present invention concerns how ads are to be presented to their audience and how advertisers can manage their advertising costs.

§1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" in the Specification without loss of generality) selects one of these banner ads by clicking on it, embedded hypertext links typically direct the viewer to the advertiser's Web site. This process, wherein the viewer selects an ad, is commonly referred to as a "click-through". ("Click-through" is intended to include any user selection.) The ratio of the number of click-throughs to the number of impressions of the ad (i.e., the number of times an ad is displayed) is commonly referred to as the "click-through rate" of the ad.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning purported "search results" in response to user queries. The Overture.com web site permits advertisers to pay to position an ad for their Web site (or a target Web site) higher up on the list of search results. If such schemes in which the advertiser only pays if a user clicks on the ad (i.e., cost-per-click) are implemented, the advertiser lacks incentive to target their ads effectively, since a poorly targeted ad will not be clicked and therefore will not require payment. As a result, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

U.S. patent application Ser. No. 10/112,654, entitled "METHODS AND APPARATUS FOR ORDERING ADVERTISEMENTS BASED ON PERFORMANCE INFORMATION AND PRICE INFORMATION", filed on Mar. 29, 2002, and listing Salar Kamangar, Eric Veach and Ross Koningstein as the inventors (hereafter referred to as "the Kamangar application", and incorporated herein by reference.), provides a better scheme, in which ads are positioned (or otherwise rendered with relative preference) as a function of both price and at least one performance parameter (such as click-through rate for example).

It would be useful to help advertisers manage their bidding in any of the foregoing schemes (that is, the foregoing schemes in which ad position (or other relative preferential rendering) is, at least in part, based on a bid price). Software which automates tracking bids, bidding, and updating bids (known as "robots") are known. However, such robots allow sophisticated bidders to have an unfair advantage over others. That is, sophisticated bidders can repeatedly win a bid by increasing their bid by the minimum increment (e.g., $0.01) over the highest bid automatically and without exposing the maximum that they are willing to bid. Therefore, it would be desirable to make the bidding process more fair, while permitting a winning bidder to avoid "winner's remorse" (i.e., allowing the winner to pay the least amount of money to maintain the position (or other relative rendering preference of their ad).

§2. SUMMARY OF THE INVENTION

The present invention is useful with an advertising system which provides a fair bidding process in which a winning bidder is assured of not having paid too much. Ads may be ordered based on accepted maximum ad bid information, or a combination of maximum ad bid information and ad performance information. For example, this information may be used to determine a position (or some other ad preference) value. Cost may be determined based on the accepted maximum ad bid information and the next lower position value.

The performance information is generally a measure of user interest in the associated advertisement and may be, for example, (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, or (i) a conversion rate associated with the advertisement. Such performance information may be weighted, windowed, and/or averaged.

§3. BRIEF DESCRIPTION OF THE DRAWINGS

FIG. 1 is a high-level diagram showing parties or entities that can interact with an advertising system.

FIG. 2 is a bubble chart of an advertising environment in which, or with which, the present invention may operate.

FIG. 6 is a table of values in an example which illustrates how ad ordering and cost determination may be performed.

§4. DETAILED DESCRIPTION

Figure 3:
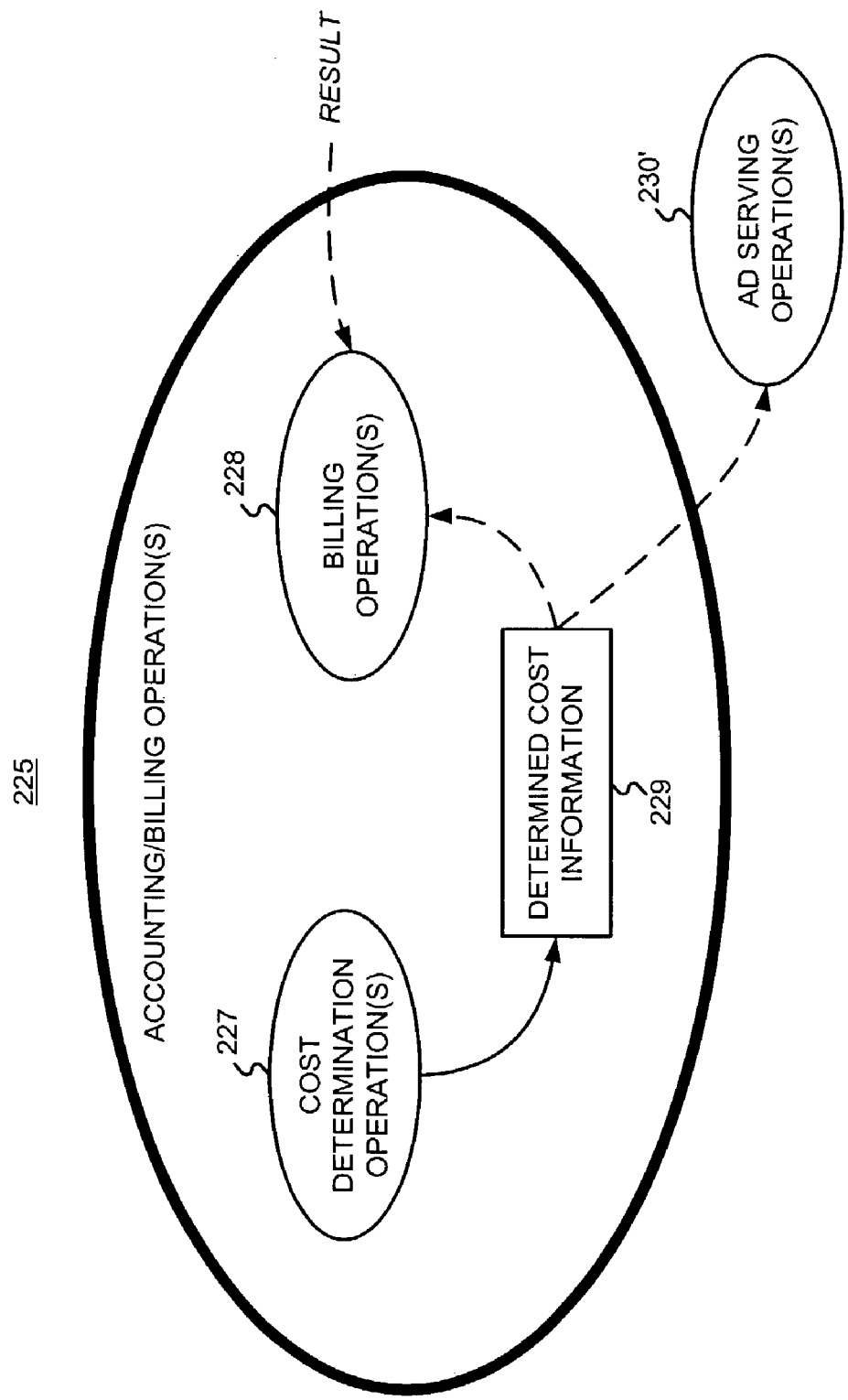
FIG. 3 is a bubble chart of some accounting and billing operations that may be used in the advertising environment of FIG. 2.

The present invention may involve novel methods, apparatus, message formats and/or data structures for providing effective advertisements in an interactive environment, for providing a fair bidding process, and for protecting a winning bidder from paying too much. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which the present invention may operate are described in 4.1. Then, exemplary embodiments of the present invention are described in 4.2. Examples of operations of an exemplary embodiment of the invention is then provided in 4.3. Finally, some conclusions regarding the present invention are set forth in 4.4.

§4.1 Environments in which, or with which, the Present Invention May Operate

§4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, audio ads, video ads, etc. Ad consumers 130 may submit requests for ads to, accept ads responsive to their request from, and provide historical or usage information to, the system 120. Although not shown, other entities may provide historical or usage information (e.g., whether or not a conversion or click-through related to the ad occurred) to the system 120.

One example of an ad consumer 130 is a general content server which receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

Figure 4:
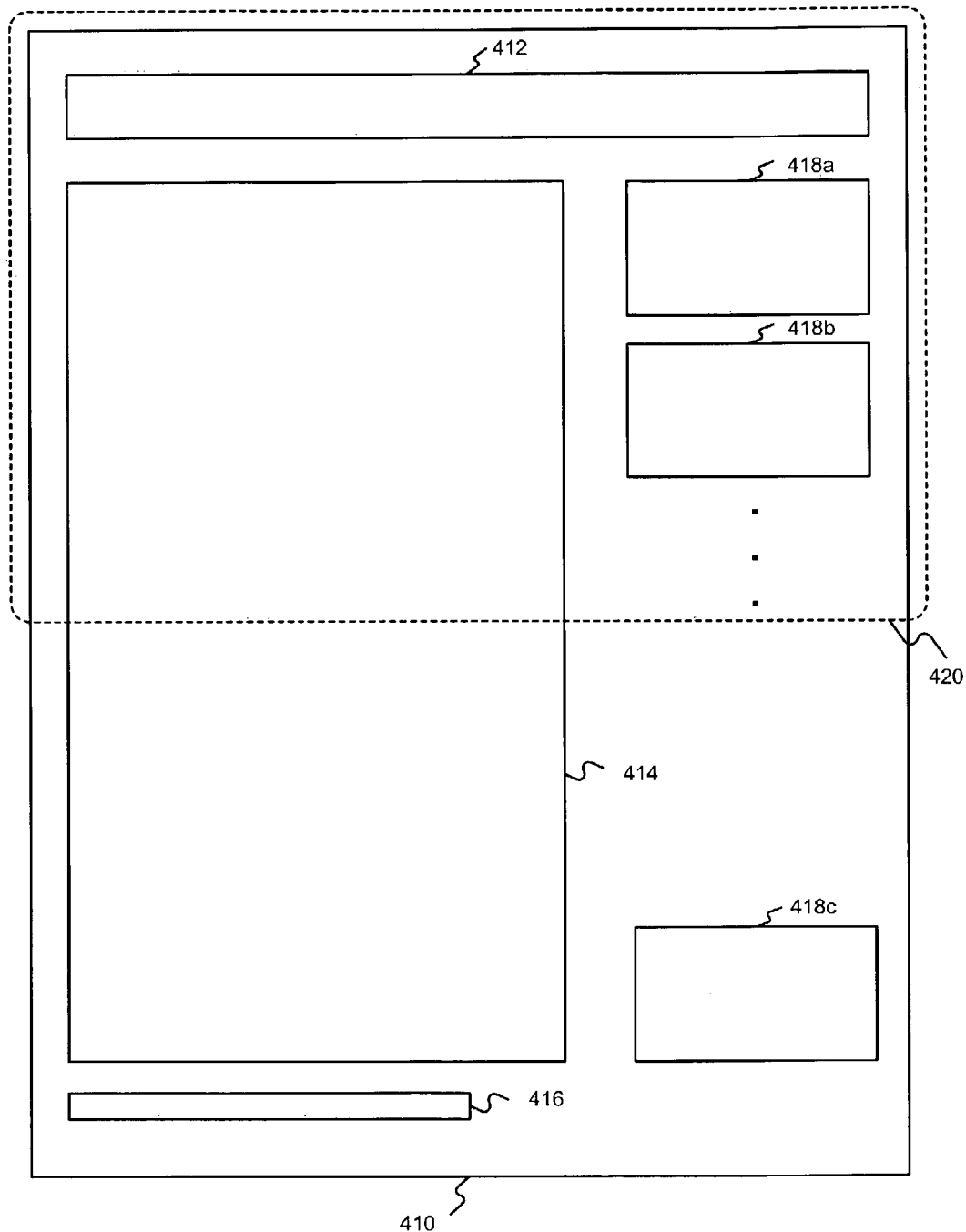
FIG. 4 is a block diagram of a Web page that may be generated by a page assembly operation of an ad consumer, for rendering on a viewer's screen.

The search engine may combine the search results with one or more of the advertisements provided by the system 120. This combined information including the search results and advertisement(s) is then forwarded towards the user that requested the content, for presentation to the user. For example, FIG. 4 is an abstract illustration of a display page 410 that may be provided by the search engine. The outline 420 depicted with dashed lines corresponds to a portion of the display page 410 that may be viewed on a typical personal computer display screen at a typical resolution. The exemplary display page 410 may include header information 412 (e.g., the name of search engine host), trailer information 416 (e.g., copyright, navigational hypertext links, etc.), a plurality of search results 414 and a plurality of ads 418a, 418b, and 418c. Preferably, the search results 414 are maintained as distinct from the ads 418, so as not to confuse the user between paid advertisements and presumably neutral search results. Although FIG. 4 shows only three ads 418, embodiments consistent with the present invention may have more or less ads. For example, ten search results combined with ten ads has been found to be effective.

Finally, the search engine may transmit information about the ad and how the ad was to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

FIG. 2 illustrates an exemplary ad system 120', consistent with the present invention. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(s) 220, accounting and billing operation(s) 225 (which may include a cost determination operation(s) 227), ad serving operation(s) 230, relevancy determination operation(s) 235, optimization operations 240, presentation ordering operations 250, fraud detection operation(s) 255, and result(s) interface operation(s) 260. Advertisers 110 may interface with the system 120' via the ad information entry and management operation(s) 215 as indicated by interface 216. Ad consumers 130 may interface with the system 120' via the ad serving operation(s) 230 as indicated by interface 231. Ad consumers 130 or other entities (not shown) may also interface with the system 120' via results interface operation(s) 260 as indicated by interface 261.

Referring to FIG. 3, the accounting/billing operations 225 may include cost determination operation(s) 227 for generating determined cost information 229, as well as billing operations 228 that use such determined cost information. Notice that the ad serving operation(s) 230 may also use the determined cost information 229 (as stored, or as provided directly from the cost determination operation(s)). One aspect of the present invention concerns the cost determination operation(s) 227. Various aspects of the cost determination operation(s) 227 may depend on techniques used in the presentation ordering operations 250. The cost determination operation(s) 227 is described more fully in section 4.2.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.).

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. Finally, the ad serving operation(s) 230 may use presentation ordering operation(s) 250 to order the presentation of the ads to be returned. The fraud detection operation(s) 255 can be used to reduce fraudulent use of the advertising system (e.g., by advertisers), such as through the use of stolen credit cards. Finally, the result(s) interface operation(s) 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such result(s) information may be accepted at interface 261 and may include information to identify the ad and time the ad was served, as well as the associated result.

Figure 5:
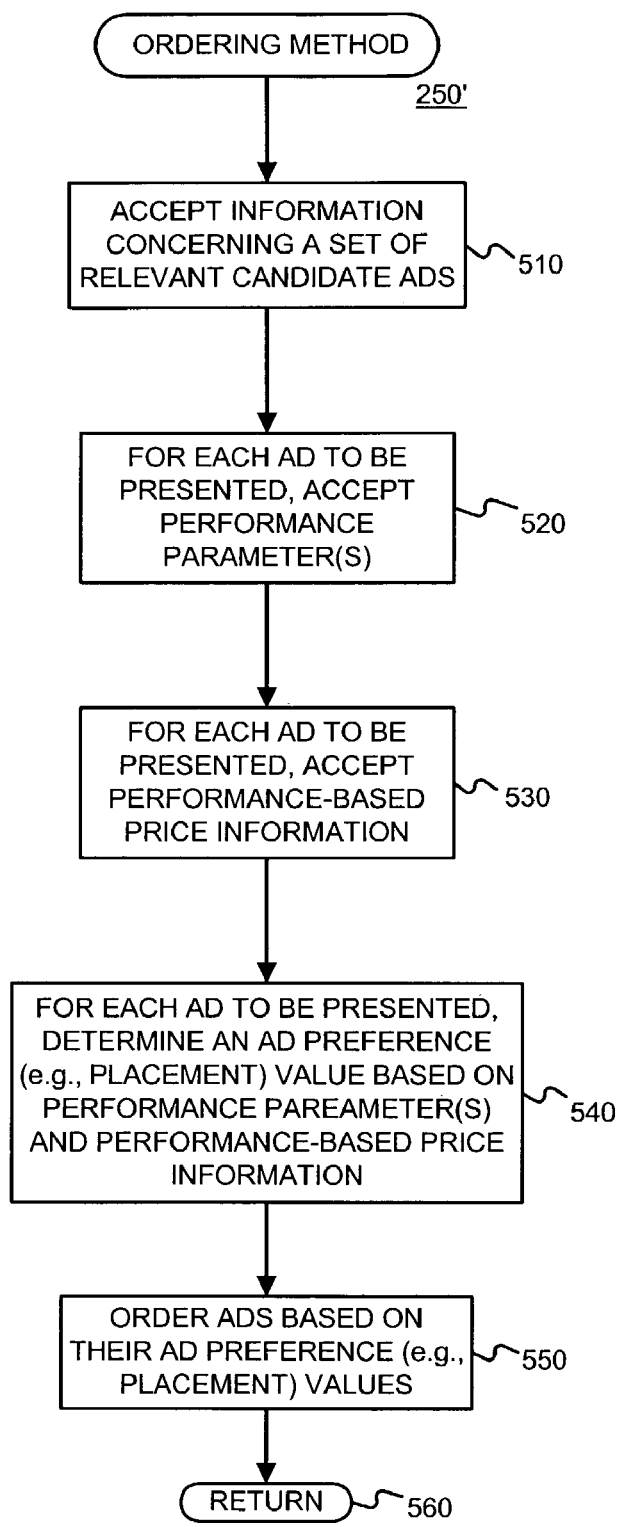
FIG. 5 is a flow diagram of an exemplary method that may be used to effect a presentation ordering operation in an environment such as that of FIG. 2.

Recall that various aspects of the cost determination operation(s) 227 may depend on techniques used in the presentation ordering operations 250. FIG. 5 is a flow diagram of an exemplary method 250' that may be used to effect such presentation ordering operation(s). This exemplary method corresponds to the method described in the Kamangar application. As indicated by block 510, a set (e.g., a list) of candidate ads is obtained. Referring to the Table of FIG. 6, suppose that this list contains the five ads—A, B, C, D, and E. Then, as indicated by block 520, one or more performance parameters (or more generally, "performance information") for each candidate ad is identified. In one implementation, the performance parameter is a windowed, time-weighted average click-through rate for the ad. As shown in the Table of FIG. 6, assume that ads A, B, C, D, and E have the following windowed, time-weighted average click-through rates, respectively: 1%, 4%, 4%, 3% and 12%.

Similarly, as indicated by block 530, a price parameter (or more generally, "price information") is identified for each candidate ad. Examples of a price parameter include a maximum cost-per-impression bid, a maximum cost-per-selection (e.g., click-through) bid, a maximum cost-per-conversion bid, etc. In the example illustrated in FIG. 6, this price is a maximum cost-per-click bid, which is preferably defined in advance as a negotiated or auction-based bid. As shown in the Table of FIG. 6, assume that at a given point in time, ads A, B, C, D, and E have the following maximum costs-per-click bids, respectively: $5.00 per click, $1.50 per click, $1.00 per click, $0.90 per click, and $0.25 per click.

In the exemplary method 250' of FIG. 5, as indicated by block 540, a placement value (or more generally, "an ad preference value") is determined for each candidate ad based on the one or more performance parameters and the price. In one implementation, this placement value is a product of the windowed, time-weighted average click-through rate and the maximum cost-per-click bid. Accordingly, as shown in the Table of FIG. 6, ad A has a score of 0.050 (0.01 multiplied by 5.00), ad B has a score of 0.060 (0.04 multiplied by 1.50), ad C has a score of 0.040 (0.04 multiplied by 1.00), ad D has a score of 0.027 (0.03 multiplied by 0.90), and ad E has a score of 0.030 (0.12 multiplied by 0.25). Finally, as indicated by block 550, the ads may be ordered based on their placement values, and the method 250' may then be left via RETURN node 560. In the present example, the order would be B, A, C, E, D.

As described in the Kamangar application, in certain cases, it may be desirable to modify the placement value produced by the method described by FIG. 5, to take into account unique information. For example, it may be desirable to increase the ad scores of certain valued or strategic advertisers, increase the placement values for campaigns that are time sensitive, etc. There may, of course, exist other reasons to increase or decrease the placement values for particular campaigns, ads, advertisers, etc. Such increases or decreases may be achieved by employing a multiplier to the overall resulting placement values, individual components of the score (e.g., click-through rate, maximum cost-per-click bid, etc), etc. Other functions, including linear functions, polynomial functions, and exponential functions for example, may employ such coefficients or values to adjust placement values. Statistical weighting (e.g., based on a deviation such as a standard deviation) may also be used to adjust price and/or performance information. Such time and/or statistical weighting may be used, for example, to desensitize the presentation ordering operation(s) to spikes or other anomalies.

Using the example page shown in FIG. 4, assume that the ad consumer 130 is a search engine that requested three ads. Using the method described in reference to FIG. 5, the three highest scoring ads (B, A, and C) would be returned, with ad B being shown in position 418a, ad A in position 418b, and ad C in position 418c. In an alternative embodiment, a relative size or other prominence feature of the ad, in addition to, or instead of, the placement order of the ads, may be based on the placement values (or the ad preference value) associated with the ads.

As described in the Kamangar application, it may be desirable not to show only the highest ranking ads. For example, it may be that new or low ranking ads have not been shown enough to have a statistically meaningful performance parameter. In this case (or even in general), one might artificially or temporarily increase the placement values for certain ads (e.g., new or low ranking ads) at random, periodic, or other intervals. Alternatively, it may be desirable never to return ads with scores below a defined threshold, so long as they have been shown a statistically sufficient number of times to discern their performance.

Note that the exemplary ordering method 250' is advantageous in that it can be used to "normalize" cost per different types of result and different performance parameters to some monetary or revenue unit. For example, if a first advertiser wanted to pay based on conversions, while a second advertiser wanted to pay based on click-throughs, the placement values could be normalized to dollars as shown:

$$\frac{dollars}{conversion} \times \frac{conversions}{100\ impressions} \Rightarrow \frac{dollars}{100\ impressions}; and$$

$$\frac{dollars}{click\text{-}through} \times \frac{click\text{-}throughs}{100\ impressions} \Rightarrow \frac{dollars}{100\ impressions}$$

Such normalization permits advertisers that want to pay for their advertising using different metrics to compete on a common basis.

Using conversion rate information may be particularly attractive to advertisers, for it provides a direct way for advertisers to compare their advertising cost to the benefits they obtain from that advertisement. For example, suppose an advertiser (Advertiser W) is able to estimate that approximately 15% of users who see an advertisement for a set of keywords ultimately make a purchase from Advertiser W. And suppose further that Advertiser W can estimate that on average each such purchase resulted in revenue of $50 to Advertiser W. Advertiser W can then determine that the value to it of each advertisement is $7.50 (0.15 multiplied by $50). Advertiser W can use that information to decide how much it is willing to pay for those advertisements, which would presumably be some amount less than $7.50. Indeed, Advertiser W could even provide ad system 120 with an average profit or revenue amount for conversions associated with a given set of keywords and leave it to ad system 120 to maximize the benefit achieved by Advertiser W.

Suppose further that Advertiser X is able to estimate that for the same set of keywords, approximately 30% of user who see its advertisement make a purchase from Advertiser X for an average price of $50. The value of the ad to Advertiser X is $15 (0.30 multiplied by $50). Therefore, Advertiser X ought to be willing to pay more for its advertisement than Advertiser W would be (e.g., up to $15 rather than up to $7.50).

An advertiser, however, may not want to provide ad system 120 with the conversion information specified above. The advertiser may, instead, simply specify the price they are willing to pay for each conversion. Using the example above, Advertiser X may specify a maximum (or average, or other) price per conversion of $15, while Advertiser W may specify a price per conversion of $7.50. Ad system 120 may then use that information in determining how to order the advertisements (e.g., Advertiser X's ad first, then that of Advertiser W) and how much to charge for those ads.

What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase of the advertiser's web page within seven days. Many other definitions of what constitutes a conversion are possible.

As mentioned earlier, a potential benefit of the organization of exemplary display page 410 is that the search results 414 are maintained as distinct from the ads 418. The search results are ordered based on criteria that determines how relevant those information sources are to the search query entered by the user. The ads are ordered based on the methods described above. Yet by maintaining clear linear separation between the search results 4614 and the ads 418, the user is not misled into confusing search results with paid advertisements. This allows the display of multiple ads on the same page as multiple search results while maintaining separation between the two such that a viewer can clearly distinguish search results from paid ads. Although display page 410 shows the advertisements positioned to the right of (adjacent) search results, other ways to separate the content from the advertisements are also possible. For example, the advertisements could be positioned to the left of (adjacent) search results.

§4.2 EXEMPLARY EMBODIMENTS

§4.2.1 Exemplary Cost Determination Methods

Figure 7:
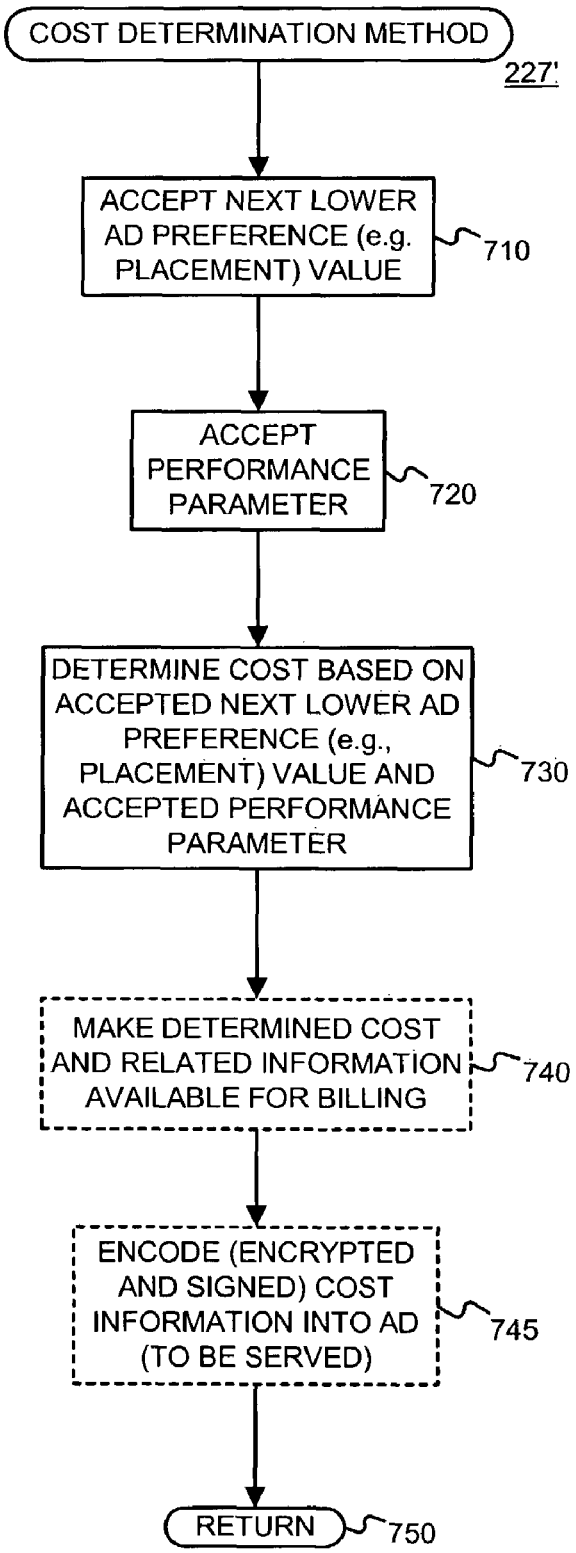
FIG. 7 is a flow diagram of an exemplary method that may be used to determine a cost to be charged to an advertiser.

FIG. 7 is a flow diagram of an exemplary method 227' that may be used to effect a cost determination operation(s) 227. This exemplary method 227' ensures that each "winner" does not pay more than is necessary to maintain the determined position (or other relative rendering preference) of its ad. This method 227' may be invoked, for example, after the ads that are to be served are determined and ordered, and is preferably invoked for each ad (to be) served. As indicated by blocks 710 and 720, for a given ad, the next lower placement value (or ad preference value) is accepted, and the performance parameter(s), used in the determination of the placement value, is also accepted. Then, as indicated by block 730, a cost is determined based on the accepted next lower placement (or ad preference) value and the accepted performance parameter.

In one embodiment, the cost is determined simply by dividing the next lower placement (or ad preference) value by the performance value(s). Continuing the example illustrated in the Table of FIG. 6 and started in connection with the presentation ordering method 250' of FIG. 5, the cost of placing ad B first is $1.25 (=ad A's placement value divided by ad B's click-through rate=0.05/0.04), the cost of placing ad A second is $4.00 (=ad C's placement value divided by ad A's click-through rate=0.04/0.01), the cost of placing ad C third is $0.75 (=ad E's placement value divided by ad C's click-through rate=0.03/0.04), and the cost of placing ad E fourth is $0.225 (=ad D's placement value divided by ad E's click-through rate=0.027/0.12).

In another embodiment of the invention, the cost charged for an ad may be determined by dividing the next lower placement (or ad preference) value by the performance value(s), and adding an amount. The amount may be a nominal value so that the ad with a higher placement (or ad preference) value costs at least the amount (or perhaps slightly more than) necessary to render the ad in a higher placement or preference position than the next lower-placed (or preferred) ad. For example, with respect to the example illustrated in the Table of FIG. 6 above, one cent ($0.01) may be added to the cost per result billed to each of the rendered ads B, A, and C, so that the cost of placing the ads in their preference order is ($1.25+$0.01)=$1.26 per click to place ad B first, ($4.00+$0.01)=$4.01 to place ad A second, and ($0.75+$0.01)=$0.76 to place ad C third. The amounts added to the ad costs for ads A, B, and C need not be the same, and may also be negative (such that, for example, the cost billed to ads B, A, and C may be ($1.25+$0.00)=$1.25, ($4.00-$0.01)=$3.99, and ($0.75-$0.01)=$0.74, respectively). One of ordinary skill will further recognize that numerous additional or substitute methods may be employed to achieve the same effect, such as by rounding the cost per result billed to a nearest convenient increment (such as the nearest penny for transactions in United States dollars), adding an amount to the maximum bid cost used to determine preference order, adjusting or rounding the performance parameter, etc.

The foregoing discussion of exemplary cost determination method 227' is provided with reference to a preferred system, such as disclosed in the Kamangar application, in which ads are positioned (or otherwise rendered with relative preference) as a function of both price and at least one performance parameter. However, one of ordinary skill in the art will recognize that the present invention is not limited to such systems. For example, in other implementations, ads may be given a placement order (or rendering preference) as a function of price information alone (e.g., cost charged per click-through), without using a performance parameter. Consistent with the invention, a cost determination method ensures that each advertiser does not pay more than is necessary to maintain the relative rendering preference when ads are positioned in this manner as a function of price but not performance.

In one embodiment, a cost (e.g. cost charged per click-through) for an ad is determined based on a maximum bid (e.g., maximum cost per click-through) of the next lower preferred ad. For example, the actual cost charged to an advertiser per click-through for the highest placed (or preferred) ad is determined based on the maximum bid per click-through of the next lower ordered ad. With reference to Table of FIG. 6 above, according to this embodiment of the invention, ads A, B, C, D, and E would have the placement order A, B, C, D, E (based on the maximum cost per click indicated by the advertiser and without reference to any performance information). However, the actual cost (per click-through) charged for ad A would be $1.50 (equal to the maximum bid per result of B, the next lower placed ad), the actual cost (per click-through) charged for ad B would be $1.00 (equal to the maximum bid per result of C, the next lower placed ad), the actual cost (per click-through) charged for ad C would be $0.90 (equal to the maximum bid per result of D, the next lower placed ad), the actual cost (per click-through) charged for ad D would be $0.25 (equal to the maximum bid per result of E, the next lower placed ad), and the actual cost (per click-through) charged for ad E would be set to some reserve price (e.g., $0.01).

As disclosed above, the actual costs charged to the advertisers whose ads are shown may be adjusted by adding an amount, such as $0.01, to provide that a higher placed ad (e.g. A) pays an actual cost per result higher than the maximum bid per result of the next lower placed ad (e.g. B). Similarly, numerous other mechanisms exist for adjusting or modifying the cost charged to advertisers.

The principle described above allows ad system 120 to separate the information used to order the ads from the actual cost charged. The ads can be ordered using solely price information (e.g., by maximum bid per click), while the actual cost charged can be based on other price information (e.g., the next lower maximum bid per click). Similarly, the ads can be ordered using solely performance information (e.g., by conversion rate), while the actual cost charged can be based on price information (e.g., bid amount, next lower bid amount, etc). Or the ads can be ordered using some combination of price and performance information (e.g., maximum bid per click multiplied by click-through rate), while the actual cost charged is based on price information (e.g., bid amount, next lower bid amount, etc).

Note that in each case, the advertiser usually pays a lower rate, e.g. the lowest rate, while still maintaining the position of its ad. The cost of the lowest placed ad can be similarly determined, unless it did not "beat out" another ad that was not served. In this case, the cost of the lowest placed ad can simply be some predetermined minimum cost (referred to as a "reserve price"), or some predetermined minimum cost modified by the performance parameter(s) of the ad. Although bids can correspond to multiple keywords (of a given ad or ad group), each particular keyword preferably has its own (system-wide) reserve price, though all keywords or groups of keywords can be associated with a single reserve price.

In the case of an ad ordering system utilizing performance information, if the performance parameters have sufficient precision, ties in placement (or ad preference) values should be rare. In the event of a tie, such a tie may be broken arbitrarily, in favor of the ad with the higher bid, in favor of the ad with the better performance parameter(s), based on some additional information or performance parameter not considered in determining the placement values, etc.

In one embodiment, both the ordering of the ads and the costs charged to the advertisers are determined substantially in real time. In other words, when ad consumer 130 requests one or more advertisements from system 120, system 120 determines the ads relevant to that request, determines the ordering of those ads, and determines the cost to be charged to those advertisers. Those skilled in the art will recognize, however, that other approaches may be used consistent with the invention. For example, the actual cost to be charged to advertisers may be determined at predefined or periodic intervals. Alternatively, it may be more efficient to predetermine responses to certain requests (e.g., popular search queries).

Once the cost is determined, as indicated by optional block 740, the determined cost (and related information) should be made available for billing. Alternatively, or in addition, the determined cost can be encoded into the ad information served, as indicated by block 745. This encoded determined cost information may be encrypted and/or signed for security purposes.

In one embodiment, any of the cost information used may be provided to advertisers in order to allow advertisers to determine how to specify information that best achieves their advertising goals. For example, maximum cost per result bid may be provided so that advertisers can determine how they wish to bid relative to other advertisers' bids. Alternatively, or in addition, actual cost per result charged may be provided. Similarly, performance information (average click-through or conversion rate, impressions/day, etc.), cost information (maximum bid cost, average billed cost per click or conversion, etc.) and results information (average billed amount per day, average position, etc.) can be provided so that advertisers have information to assist them in making their ads achieve their goals (e.g. by alerting advertisers that ad creatives should be modified, maximum bid amounts increased or decreased to achieve or maintain a certain position or preference, etc.).

§4.2.2 Exemplary Billing Methods

Figure 8:
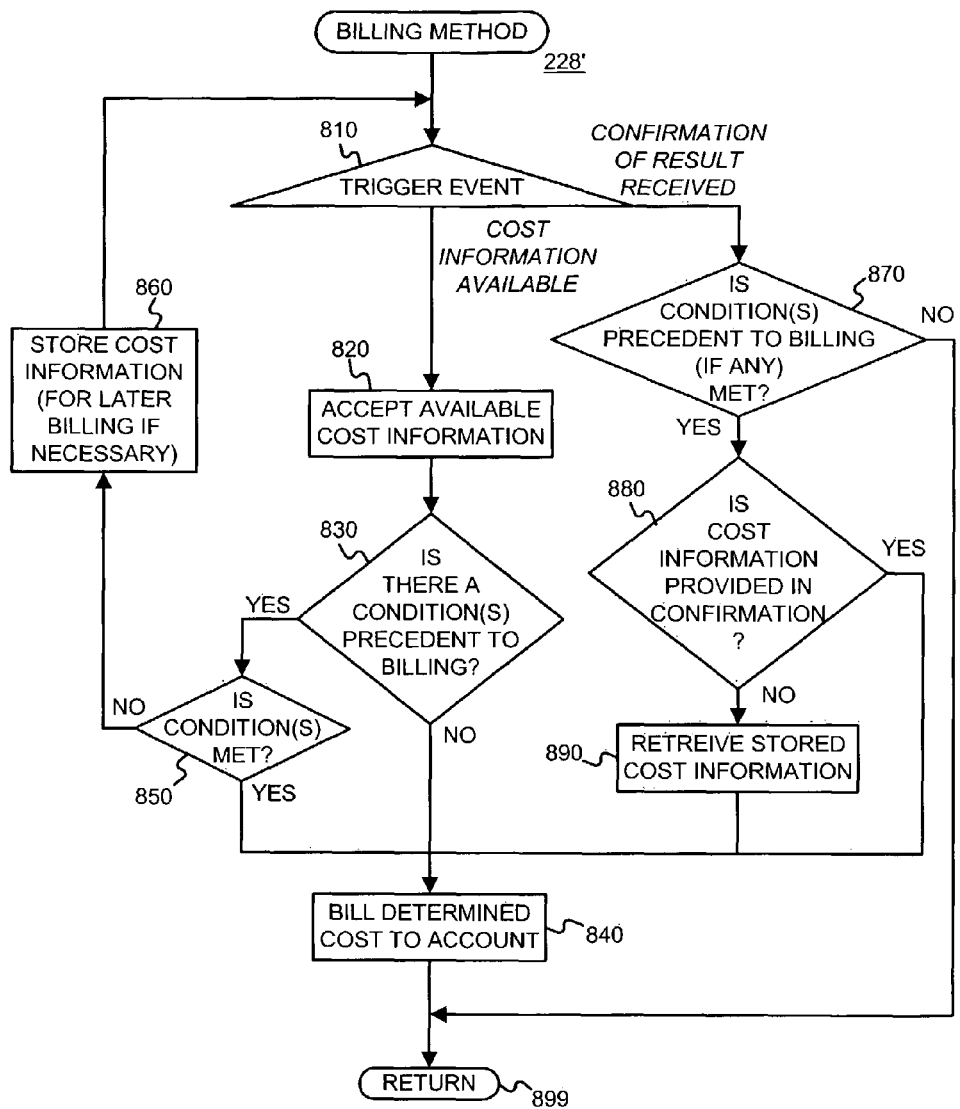
FIG. 8 is a flow diagram of an exemplary method that may be used to bill an account for an ad (to be) served.

FIG. 8 is a flow diagram of an exemplary method 228' that may be used to effect billing operation(s) 228. As shown by trigger block 810, if cost information 229 is available, such information is accepted as indicated by block 820. Then, as indicated by decision block 830, it is determined whether or not there is a condition(s) precedent to billing. That is, if an advertiser agrees to pay only when its ad is clicked or only when conversion occurs, a condition precedent (e.g., click-through or conversion) needs to occur before that advertiser is billed, even if its ad was served. If, on the other hand, the advertiser agrees to pay a maximum cost per impression, it can be billed once its ad is served. If there is a condition(s) precedent to billing, as indicated by decision block 850, it is determined whether or not this condition(s) is met. If not, the cost information is stored (for later billing, if necessary) as indicated by block 860, and processing returns to the trigger block 810. If, on the other hand, the condition(s) is met, the determined cost can be billed to the advertiser's account, as indicated by block 840, before the method 228' is left via RETURN node 899. Referring back to decision block 830, if there is no condition(s) precedent to billing, the determined cost can simply be billed to the advertiser's account, as indicated by block 840, before the method 228' is left via RETURN node 850.

Referring back to trigger block 810, if a confirmation of a result(s) is received (e.g., via the result interface operation(s) 260), it is determined whether or not a condition(s) precedent to billing, if any, is met as indicated by decision block 870. If not, the method 228' is left via RETURN node 899. If, on the other hand, the condition(s) precedent to billing, if any, is met, processing continues to decision block 880 where it is determined whether or not a determined cost information was provided with the result confirmation. If so, the determined cost is billed, as indicated by block 840, before the method 228' is left via RETURN node 899. Referring back to decision block 880, if, on the other hand, the determined cost information is not provided in the result confirmation, then (assuming that the determined cost information was previously stored (Recall block 860.)) stored determined cost information is retrieved, as indicated by block 890, before the determined cost amount is billed as indicated by block 840 and the method 228' is left via RETURN node 899.

§4.2.3 Exemplary Apparatus and Data Structures

Figure 9:
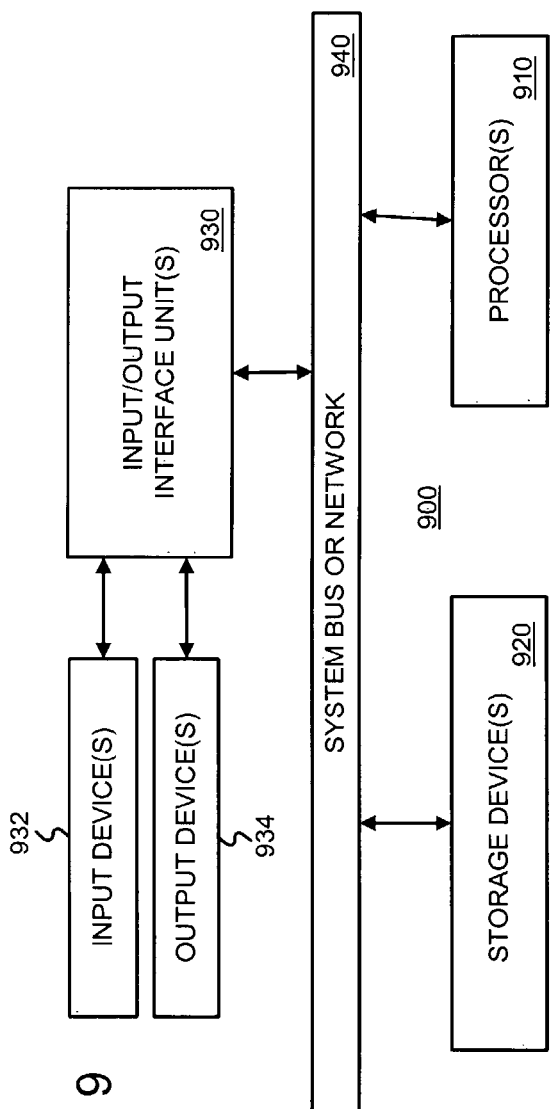
FIG. 9 is a high-level block diagram of apparatus that may be used to effect at least some of the various operations that may be performed in accordance with the present invention.

FIG. 9 is high-level block diagram of a machine 900 that may effect one or more of the operations discussed above. The machine 900 basically includes a processor(s) 910, an input/output interface unit(s) 930, a storage device(s) 920, and a system bus or network 940 for facilitating the communication of information among the coupled elements. An input device(s) 932 and an output device(s) 934 may be coupled with the input/output interface(s) 930.

The processor(s) 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 920 and/or may be received from an external source via an input interface unit 930.

In one embodiment, the machine 900 may be one or more conventional personal computers. In this case, the processing unit(s) 910 may be one or more microprocessors. The bus 940 may include a system bus. The storage devices 920 may include system memory, such as read only memory (ROM) and/or random access memory (RAM). The storage device(s) 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. However, in the context of the accounting/billing operation(s) 225, no input devices, other than those needed to accept data, and possibly those for system administration and maintenance, are needed.

The output device(s) 934 may include a monitor or other type of display device, which may also be connected to the system bus 940 via an appropriate interface. In addition to (or instead of) the monitor, the personal computer may include other (peripheral) output devices (not shown), such as speakers and printers for example. Again, in the context of accounting/billing operation(s), no output devices, other than those needed to output billing information, and possibly those for system administration and maintenance, are needed.

Figure 10:
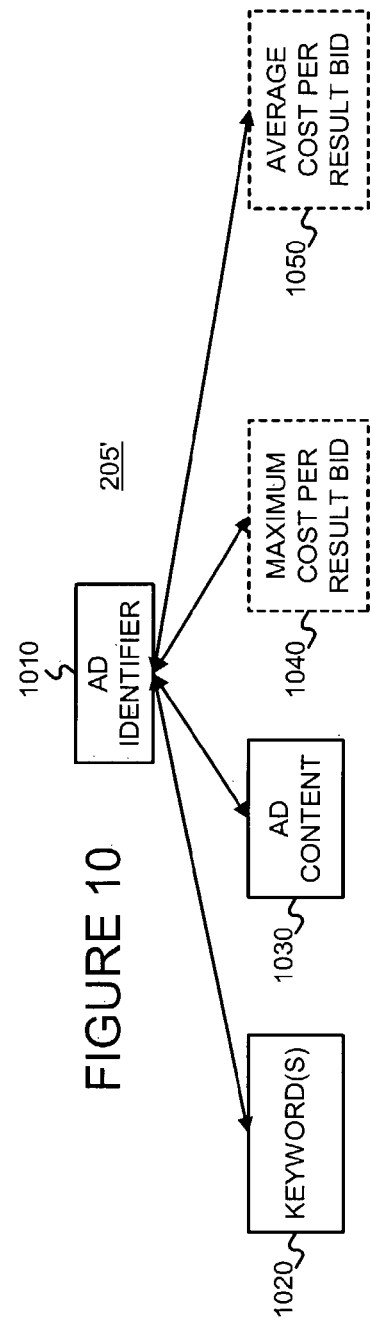
FIG. 10 illustrates a relationship among ad identification information, keyword(s), ad content, a maximum cost per result bid and an average cost per result bid.

FIG. 10 illustrates a relationship among ad identification information 1010, keyword(s) 1020, ad content 1030, a maximum cost per result bid 1040 and an average cost per result bid 1050. Various data structures for associating such information are possible. In one embodiment, the ad identifier 1010 may be unique and therefore used as a "primary key" to associate various pieces of information.

§4.2.4 Alternatives and Refinements

In the exemplary embodiment of ordering ads described above with reference to FIG. 5, ordering was strictly a matter of relative position (or ad preference) values. However, in one exemplary embodiment, advertisers can define constraints. For example, if an advertiser sets a "top position only" constraint, if their ad does not have the top position value, it will not be served and ads with lower position (or ad preference) values will move up. Referring to the example provided in FIG. 6, suppose ad C has such a "top position only" constraint. In this example, ad C would be dropped and ads E and D would each move up one spot. In this case, the cost for placing ad A second could be dropped from $4.00 to $3.00 (ad E's placement value divided by ad A's performance parameter=0.030/0.01). In another example, if an advertiser sets a "no higher than position three" constraint, if the position value of their ad is the highest, the ad with the second highest position value will move up to the first position, the ad with the third highest position value will move up to the second highest position, and the "constrained" ad will move down two positions to the third highest position. Referring to the example provided in FIG. 6, if ad A had a "no higher than third position" constraint, ad C would take ad A's second position, and ad A would move to the third position. In this case, since ad C could not fall below ad A, but could fall below ad E, its actual cost could remain at $0.75. However, ad A's actual cost could be $3.00 (ad E's placement value divided by ad A's performance parameter=0.030/0.01).

In another alternative, advertisers could also specify a maximum marginal cost. For example, if an ad has an 11% click through rate at a top position and a 10% click through rate at a second position, and if the cost is $0.60 per click for the top position and $0.50 per click for the second position, the nominal cost for an additional click is $1.60 ($6.60 for 11 clicks versus $5.00 for 10 clicks). The advertiser could specify a maximum marginal cost per result bid instead of, or in addition to, the maximum cost per result bid.

In yet another alternative, advertisers could specify a maximum average cost per result bid. In such a case, in some instances, the costs billed to the advertiser could be above this maximum average cost per result bid, so long as the average of all of the costs billed is below the maximum average cost per result bid. In a conservative implementation of this embodiment, initial instances would be at or less than the maximum average cost per result bid. In this way, a "surplus" could accrue and be applied to later instances which could be greater than the maximum average cost per result bid. In a less conservative implementation of this embodiment, initial instances could be above the maximum average cost per bid, perhaps subject to some limit, under the assumption that later costs would bring the average back to, or below, the maximum average cost per result bid. In this less conservative implementation, if later costs did not bring the average back to, or below, the maximum average cost per result bid by the time of the billing cycle, the amount billed to the advertiser could be limited such that its maximum average cost per result bid is not exceeded.

§4.3 OPERATIONS

Figure 11:
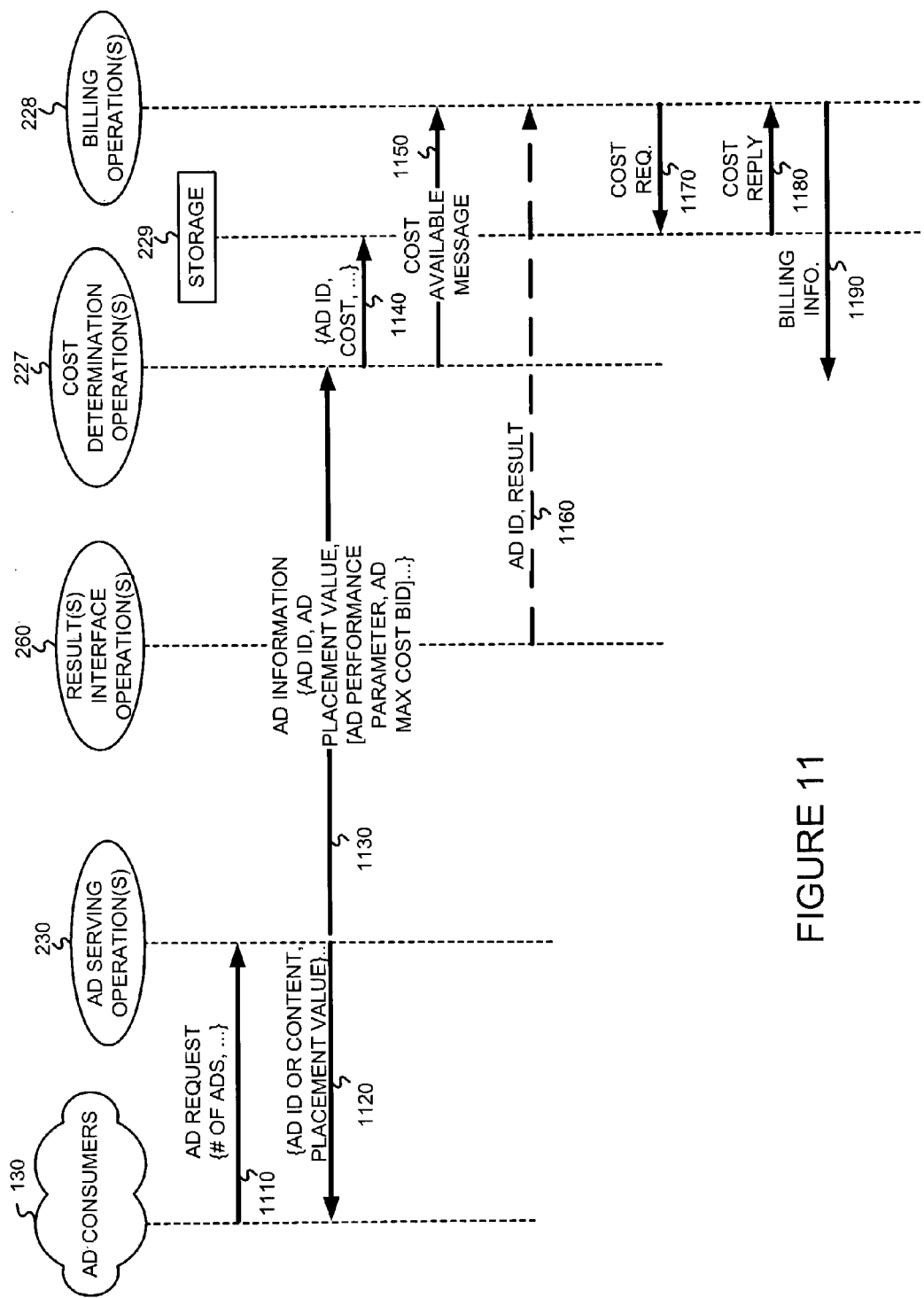
FIG. 11 is a messaging diagram illustrating exemplary operations of a first exemplary embodiment of the present invention.

FIG. 11 is a messaging diagram illustrating exemplary operations of a first exemplary embodiment of the present invention. As indicated by communication 1110, an ad serving operation(s) 230 receives an ad request from an ad consumer 130. The ad request may include the number of ads desired, as well as other information. In response to the request, the ad serving operation 230 may get ordered, relevant ads (Recall, for example, operations 235 and 250 of FIG. 2). As shown by communications 1120 and 1130, the ad serving operation(s) 230 may then (i) provide, for each ad determined in response to the request 1110, the ad content (or an identifier for obtaining the ad content) and a placement value to the ad consumer 130, and (ii) provide, for each ad determined in response to the request 1110, ad information (preferably including at least an ad identifier and an ad placement value) to a cost determination operation(s) 227. In response, the cost determination operation(s) 227 may determine, for each ad served, a cost that may, perhaps subject to a condition precedent, be billed to an advertiser. As indicated by communication 1140, the cost determination operation(s) 227 may then store the ad information, for each ad served, (preferably including at least an ad identifier and a determined cost) in storage device 229. Further, as indicated by communication 1150, the cost determination operation(s) 227 may indicate to the billing operation(s) 228, that the cost information is available. If billing is subject to a condition precedent (such as a click-through or a conversion for example), the billing operation(s) will await result information from the result interface operation(s) 260 as indicated by message 1160. If such a condition precedent is met, or is not required (such as if a cost is a cost per impression), the billing operation(s) can request and receive the determined cost stored in storage 229, as indicated by communications 1170 and 1180, respectively. The billing operation(s) may then generate billing information to be charged to the relevant advertiser(s), as indicated by communication 1190.

Figure 12:
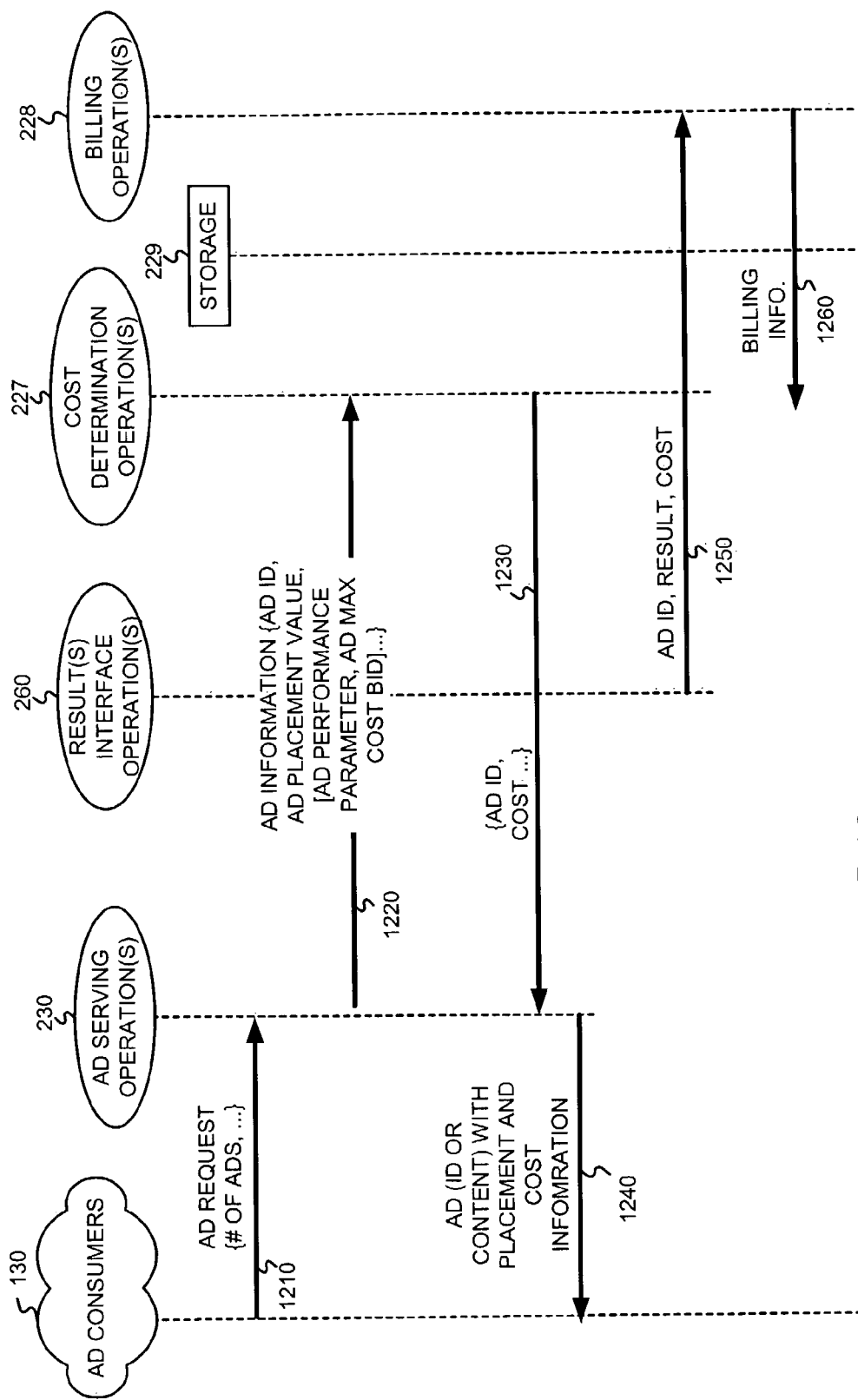
FIG. 12 is a messaging diagram illustrating exemplary operations of a second exemplary embodiment of the present invention.

FIG. 12 is a messaging diagram illustrating exemplary operations of a second exemplary embodiment of the present invention. This second embodiment is useful when billing is subject to a condition precedent. As indicated by communication 1210, an ad serving operation(s) 230 receives an ad request from an ad consumer 130. The ad request may include the number of ads desired, as well as other information. In response to the request, the ad serving operation 230 may get ordered, relevant ads (Recall, e.g., operations 235 and 250 of FIG. 2.). As shown by communication 1220, the ad serving operation(s) 230 may then provide, for each ad determined in response to the request 1210, ad information (preferably including at least an ad identifier and an ad placement value) to a cost determination operation(s) 227. In response, the cost determination operation(s) 227 may determine, for each ad to be served, a cost that may, perhaps subject to a condition precedent, be billed to an advertiser. As indicated by communication 1230, the cost determination operation(s) 227 may then provide ad information (preferably including at least an ad identifier and the determined cost) back to the ad serving operation(s) 230. In response, the ad serving operation(s) 230 provides, for each ad, the ad content (or an identifier for obtaining the ad content) and the determined cost information and placement information, as indicated by communication 1240. In this case, it is assumed that billing is subject to a condition precedent (such as a click-through or a conversion for example). Thus, the billing operation(s) will await result information from the result interface operation(s) 260 as indicated by message 1250. Here, the communication 1250 preferably includes the previously determined ad cost information, in addition to an ad identifier and result information. The result information may be implied, for example from the presence or absence of a result message. If the condition precedent is met, the billing operation(s) 228 may then generate billing information to be charged to the relevant advertiser(s), as indicated by communication 1260.

§4.4 CONCLUSIONS

As can be appreciated from the foregoing disclosure, the advertising techniques described above account for the interests of users (e.g., users of a search engine) by providing them with ads that are of interest and that are not easily confused with noncommercial requested content (such as search results), if any. Further, the interests of the advertisers are well served since users will presumably be more likely to click-through on ads that are of interest to them. Moreover, the present invention allows advertisers to manage their "bidding" for placing their advertisement easily, while being assured that they won't pay more than they need to.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the accounting and billing operation(s) 225 can be distributed among various ad consumers 130, rather than operating centrally at the ad entry, maintenance and delivery system(s) 120.

What is claimed is:

1. A computer-implemented method comprising:
   a) receiving, by a computer system including at least one computer, a plurality of ads;
   b) determining, by the computer system, an ad preference value for each of the plurality of ads as a function of performance information associated with the ad and a maximum cost for a result bid associated with the ad, wherein the performance information associated with the ad is selected from a group consisting of (i) a selection rate of the ad, (ii) a conversion rate of the ad, (iii) an expected selection rate of the ad, and (iv) an expected conversion rate of the ad;
   c) determining, by the computer system, a cost for each of the plurality of ads, the cost being lower than the maximum cost for a result bid associated with the ad, by
      i) accepting a next lower ad preference value than that of the ad;
      ii) accepting the performance information associated with the ad; and
      iii) determining the cost based on the accepted performance information of the ad and the accepted next lower ad preference value such that a value provided by the function of the accepted performance information of the ad and the determined cost of the ad, is not less than the accepted next lower ad preference value.

2. The computer-implemented method of claim 1 wherein the ad preference value is a placement value.

3. The computer-implemented method of claim 1 wherein, for each of the plurality of ads, the performance information associated with the ad is a click-through rate of the ad, and wherein the maximum cost for a result bid associated with the ad is a maximum cost per click-through bid.

4. The computer-implemented method of claim 3 wherein, for each of the plurality of ads, the ad preference value is a function of the click-through rate of the ad and the maximum cost per click-through bid associated with the ad.

5. The computer-implemented method of claim 3 wherein, for each of the plurality of ads, the ad preference value includes a multiplicative product of the click-through rate of the ad and the maximum cost per click-through bid associated with the ad.

6. The computer-implemented method of claim 5 wherein the cost of the ad is determined by dividing the next lower ad preference value by the click-through rate of the ad.

7. The computer-implemented method of claim 6 further comprising:
   d) accepting, by the computer system, result information indicating whether or not click-through on one of the plurality of ads occurred; and
   e) billing, by the computer system, the cost determined to an advertiser associated with the one of the plurality of ads only if the accepted result information indicates that click-through occurred.

8. The computer-implemented method of claim 1 wherein, for each of the plurality of ads, the performance information associated with the ad is a conversion rate of the ad, wherein a conversion includes a purchase, and wherein the maximum cost for a result bid associated with the ad is a maximum cost per conversion bid.

9. The computer-implemented method of claim 8 wherein, for each of the plurality of ads, the preference value of the ad is a function of the conversion rate of the ad and the maximum cost per conversion bid associated with the ad.

10. The computer-implemented method of claim 8 wherein, for each of the plurality of ads, the preference value of the ad includes a multiplicative product of the conversion rate of the ad and the maximum cost per conversion bid associated with the ad.

11. The computer-implemented method of claim 10 wherein the cost of the ad is determined by dividing the next lower ad preference value by the conversion rate of the ad.

12. The computer-implemented method of claim 11 further comprising:
   d) accepting, by the computer system, result information indicating whether or not conversion of one of the plurality of ads occurred; and
   e) billing, by the computer system, the cost determined to an advertiser associated with the one of the plurality of ads only if the accepted result information indicates that conversion occurred.

13. The computer-implemented method of claim 1 further comprising:
   d) encoding, by the computer system and for each of the plurality of ads, the cost determined; and
   e) serving, by the computer system and for each of the plurality of ads, the encoded cost with the ad.

14. The computer-implemented method of claim 1 wherein each of the plurality of ads is associated with a group of one or more keywords.

15. The computer-implemented method of claim 1 wherein, for each of the plurality of ads, the maximum cost for a result bid is a maximum average cost per result associated with the ad.

16. The computer-implemented method of claim 1 wherein, for each of the plurality of ads, the maximum cost for a result bid is a maximum cost for an incremental result bid associated with the ad.

17. Apparatus comprising:
   a) one or more processors;
   b) at least one input device; and
   c) one or more storage devices storing processor-executable instructions which, when executed by one or more processors, perform a method of:
      1) receiving, via the at least one input device, a plurality of ads,
      2) determining an ad preference value for each of the plurality of ads as a function of performance information associated with the ad and a maximum cost for a result bid associated with the ad, wherein the performance information associated with the ad is selected from a group consisting of (i) a selection rate of the ad, (ii) a conversion rate of the ad, (iii) an expected selection rate of the ad, and (iv) an expected conversion rate of the ad,
      3) determining a cost for each of the plurality of ads, the cost being lower than the maximum cost for a result bid associated with the ad, by
         i) receiving as input, for each of the plurality of ads, a next lower ad preference value than that of the ad, and
            the performance information associated with the ad, and
         ii) determining the cost based on the performance information of the ad and the accepted next lower ad preference value such that a value provided by the function of the performance information of the ad and the determined cost of the ad, is not less than the next lower ad preference value.

18. The apparatus of claim 17 wherein the ad preference value is a placement value.

19. The apparatus of claim 17 wherein the performance information associated with the ad is a click-through rate of the ad, and wherein the maximum cost for a result bid associated with the ad is a maximum cost per click-through bid.

20. The apparatus of claim 19 wherein, for each of the plurality of ads, the ad preference value is a function of the click-through rate of the ad and the maximum cost per click through bid associated with the ad.

21. The apparatus of claim 19 wherein, for each of the plurality of ads, the ad preference value includes a multiplicative product of the click-through rate of the ad and the maximum cost per click through bid associated with the ad.

22. The apparatus of claim 21 wherein the act of determining the cost of the ad is determined by dividing the next lower ad preference value by the click-through rate of the ad.

23. The apparatus of claim 22 wherein the act of receiving as input further receives as input, result information indicating whether or not click-through on one of the plurality of ads occurred, the method further including
   4) billing the cost determined to an advertiser associated with the one of the plurality of ads only if the result information indicates that click-through on the ad occurred.

24. The apparatus of claim 17 wherein the performance information associated with the ad is a conversion rate of the ad, wherein a conversion includes a purchase, and wherein the maximum cost for a result bid associated with the ad is a maximum cost per conversion bid.

25. The apparatus of claim 24 wherein, for each of the plurality of ads, the preference value of the ad is a function of the conversion rate of the ad and the maximum cost per conversion bid associated with the ad.

26. The apparatus of claim 24 wherein, for each of the plurality of ads, the preference value of the ad includes a multiplicative product of the conversion rate of the ad and the maximum cost per conversion bid associated with the ad.

27. The apparatus of claim 26 wherein the act of determining the cost of the ad is determined by dividing the next lower ad preference value by the conversion rate of the ad.

28. The apparatus of claim 27 wherein the act of receiving as input further receives as input, result information indicating whether or not conversion of one of the plurality of ads has occurred, the method further including
   4) billing the cost determined to an advertiser associated with the one of the plurality of ads only if the accepted result information indicates that conversion on the ad occurred.

29. The apparatus of claim 17 wherein each of the plurality of ads is associated with a group of one or more keywords.

30. The apparatus of claim 17 wherein, for each of the plurality of ads, the maximum cost for a result bid associated with the ad is a maximum average cost per result.

31. The apparatus of claim 17 wherein, for each of the plurality of ads, the maximum cost for a result bid is a maximum cost for an incremental result bid associated with the ad.

32. A computer-implemented method comprising:
   a) determining, by a computer system including at least one computer and for each of a plurality of ads, an ad preference value as a function of performance information associated with the ad and a maximum cost for a result bid associated with the ad, wherein the performance information associated with the ad is selected from a group consisting of (i) a selection rate of the ad, (ii) a conversion rate of the ad, (iii) an expected selection rate of the ad, and (iv) an expected conversion rate of the ad;
   b) ordering, by the computer system, the plurality of ads using the determined ad preference values;

c) controlling, by the computer system, a serving of the plurality of ads using the ordering such that a rendering of the ads will be controlled; and d) determining, by the computer system, a cost lower than the maximum cost associated with one of the plurality of ads, by i) accepting an ad preference value of another of the plurality of ads having a next lower preference value to the preference value of the one of the plurality of ads, ii) accepting the performance information associated with the one of the plurality of ads, and iii) determining the cost by dividing (1) the accepted an ad preference value of the other of the plurality of ads having a next lower preference value to the preference value of the one of the plurality of ads by (2) the performance information associated with the one of the plurality of ads.

\* \* \* \* \*